Nov. 3, 1970     D. A. PADDOCK ET AL     3,537,165

METHOD OF MAKING A PLATE-TYPE HEAT EXCHANGER

Filed June 26, 1968

INVENTOR.
Carrol B. Kemp
BY David A. Paddock

Wayne H. Lang
AGENT

United States Patent Office 3,537,165
Patented Nov. 3, 1970

3,537,165
METHOD OF MAKING A PLATE-TYPE HEAT EXCHANGER
David A. Paddock, Merrimack, N.H., and Carrol B. Kemp, Millport, Pa., assignors to The Air Preheater Company, Inc., Wellsville, N.Y., a corporation of Delaware
Filed June 26, 1968, Ser. No. 740,197
Int. Cl. B23p 15/26
U.S. Cl. 29—157.3                    2 Claims

ABSTRACT OF THE DISCLOSURE

A plate-type heat exchanger comprised of dish-like corrugated plates abutting in a face-to-face and back-to-back relation whereby the plates may be simply formed, readily assembled and effectively joined together by welding to form an integral assembly.

BACKGROUND OF THE INVENTION

Field of the invention

Figure 1:
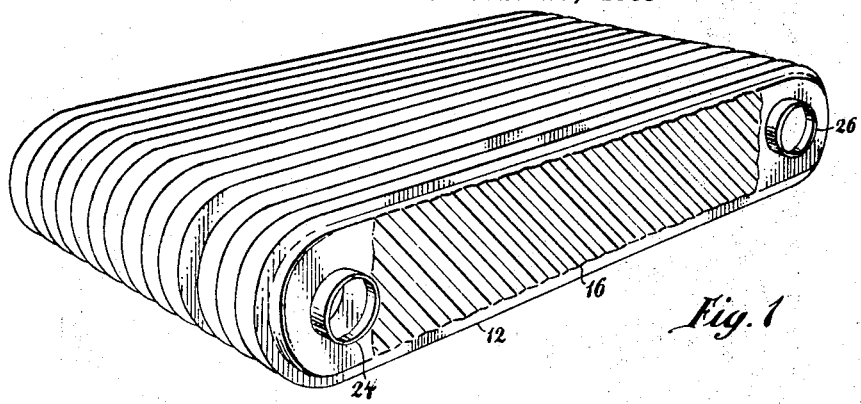

This invention relates to a recuperative heat exchanger of the plate-type, the parts of which are easily assembled and welded into a unit which is substantially leakage-free.

Descriptive of prior art

Various attempts have been made to provide a heat exchanger of the type wherein a series of thin metallic plates are assembled in a face-to-face arrangement to define envelopes having thin passageways therebetween for the separate flow of a fluid in heat exchange relation with another fluid flowing over the exterior thereof. Such an arrangement is shown by U.S. Pat. No. 2,550,339 and No. 2,610,839 wherein fluid leakage from the space between plates is precluded by the use of a packing or gasket intermediate the plates. While such types of apparatus are good for most applications where limited leakage is allowable, the development of technology in various fields frequently demands the use of a heat exchanger wherein absolutely no leakage is permitted so that the leakage of poisonous caustic or otherwise harmful fluids may be positively prevented.

SUMMARY OF THE INVENTION

This invention therefore relates to a recuperative heat exchanger of the plate-type comprised of a series of sheets which may be bonded into a leakage-free heat exchanger of the plate-type comprised of a series of sheets which may readily abut at their edges and may be easily welded together into an integral assembly.

The general objective of this invention is therefore to provide a heat exchanger of the plate-type which is comprised of simply formed substantially plane or slightly "dished" sheets which are adapted to be welded together along their abutting edges into a leakage-free assembly.

More particularly, it is an objective of this invention to provide a plate-type heat exchanger construction having a minimum number of connections that may be welded together into a unitary assembly whereby the welded joints of the individual sub-assemblies thereof may be easily tested for leakage before it is necessary to join a number of subassemblies into a completed heat exchanger.

With these objectives in mind the invention comprises essentially a series of abutting plate-like members which have laterally aligned openings formed in the opposite ends thereof for passage of fluid therethrough. A pair of plates so formed are first assembled in a back-to-back arrangement whereby they may be joined together into a heat exchanger sub-assembly by welding around the periphery of adjacent openings. A welded connection so formed is readily accessible and may then be tested exhaustively for leakage by any of several commercially available testing devices such as a mass spectrometer type leakage testing apparatus. Only after satisfactorily passing such a test by having a continuous weld that will preclude the possibility of eventual leakage are similar sub-assemblies then placed one upon another and the edges of abutting plates similarily joined in a face-to-face relation by welding. An entire assembly so assembled and bonded may be used in this manner by connecting it to the proper supply and exhaust ducts or it may be adapted for use at considerably higher pressures by placing it in a strongback assembly whereby suitable connections may be made and a fluid directed therethrough while another fluid differing substantially in pressure is allowed to flow over the exterior surface thereof.

Figure 2:
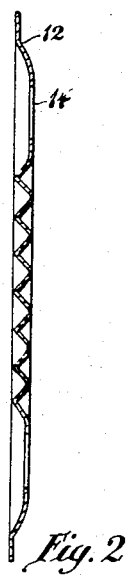
Figure 3:
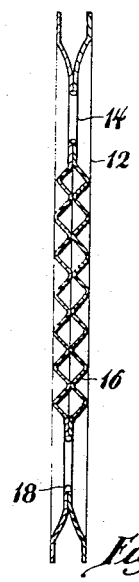
Figure 4:
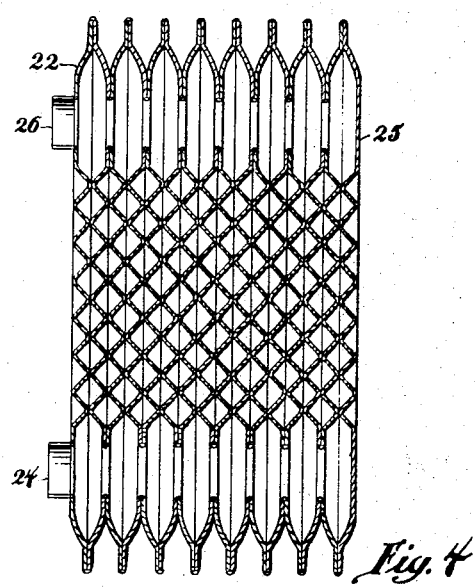
Figure 5:
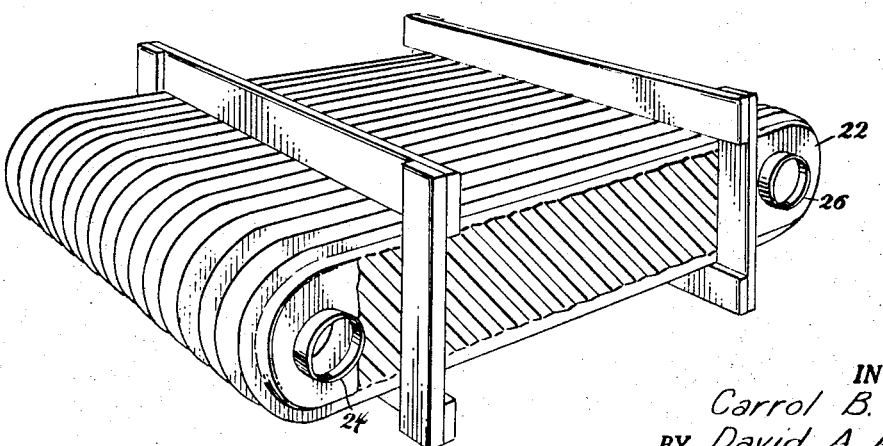

The invention will now be explained in greater detail, reference being had to the accompaning drawings illustrating the embodiments thereof in which:

FIG. 1 shows a perspective view of a heat exchanger constructed according to the teaching of this invention, FIG. 2 shows cross-section of a single plate of the heat exchanger, FIG. 3 is a cross-section of a pair of plates welded together into a basic sub-assembly, FIG. 4 is a cross-section of the heat exchanger shown in FIG. 1, and FIG. 5 is a heat exchanger of the type shown in FIG. 1 enclosed in a strongback arrangement.

In carrying the invention into effect the arrangement of FIG. 1 comprising a pair of suitably formed plates 12 of "dish-like" configuration is welded around the apertures 14 thereof into a sub-assembly of two back-to-back plates in the arrangement shown in FIG. 3. In so bonding them a pair of said plates are first clamped together in back-to-back arrangement with the apertures 12 thereof in alignment and the corrugations 16 there of lateral abutment. A welding tool is inserted into said opening and the tool is progressively moved around the edge of the opening, or by the use of suitable welding procedures the sub-assembly is otherwise slowly rotated about a stationary welding device to subject the abutting plates around the apertures to the welding process whereby on cooling they are permanently joined by an edge weld 18.

The sub-assemblies so formed are next assembled with the edges of their outwardly extending faces in contact with the edges of plates of other similar sub-assemblies and then imilarily welded together by another process of edge welding. Additional sub-assemblies may be added until the heat exchanger in its entirety has the desired capacity. A single end plate 22 may be secured at the end of each assembly to enclose it into a fluid-tight heat exchanger. The plate 22 is preferably similar to plates 12 to insure that the rates of expansion and contraction are the same and that response to the welding operation will be identical whereby there will be no failure or leakage from breakage which is due to a differential of expansion.

Suitable flanges comprising entrance and exhaust connections 24 and 26 may be welded to the end plate 22 around its apertures 14 to permit connection thereto of suitable supply and exhaust ducting. The end plate at the opposite end of the heat exchanger assembly may be a simple closure sheet 25 or it too may be apertured in accordance with the design of the system to produce any of several flow patterns through the heat exchanger.

When low pressure fluid is directed through the spaces enclosed by "dished" plates in a face-to-face abutment, no outer housing or strongback arrangement is needed to restrain the pressure within. If however a fluid at a pressure higher than the ambient is directed through the apertures and into the space between abutting plates each plate will be forced outward by the unbalance of fluid pressure. Inasmuch as all plates except plates 22 and 25 at the ends of the assembly laterally abut one another they provide a mutual support, while the walls of the assembly at the remote ends thereof may be supported and restrained against outward forces by a strongback arrangement 26 such as that shown schematically in FIG. 5.

A heat exchanger assembled and bonded by welding according to the manner defined is strong and substantially free from the possibility of fluid leakage. A contributing factor in the elimination of leakage is the fact that the welding operation commonly used eliminates the use of a soldering flux, therefore there are no flux inclusions in the bond which may be readily dissolved and produces voids which become paths for leakage and thus contribute to an overall reduction in strength and effectiveness of the unit.

While this invention has been described with reference to the embodiment illustrated in the drawing it is evident that various changes may be made without departing from the spirit of the invention and it is intended that all matter contained in the above description or shown in the accompanying drawings shall be interpreted as illustrative and not in a limiting sense.

We claim:
1. The method of making a plate-type recuperative heat exchanger from a series of a laterally adjacent plates having a plurality of apertures therein comprising joining into sub-assemblies a pair of said plates by welding them together in back-to-back relation around the periphery of adjacent apertures, placing a series of said sub-assemblies in lateral juxtaposition, and welding marginal edges of laterally adjacent sub-assemblies together to provide a heat exchange assembly whereby a single fluid may flow in one and out another of said apertures while a different fluid is adapted to flow in heat exchange relation therewith over the exterior of said assembly.

2. The method of making a plate-type heat exchanger as defined in claim 6 wherein a single plate having an outer configuration and apertures therein similar to those of the plates of the sub-assemblies is welded to the ends of the heat exchanger assembly to enclose the space within the heat exchanger.

References Cited

UNITED STATES PATENTS

| Re. 19,778 | 12/1935 | Litle | 113—118 |
| 1,685,388 | 9/1928 | White | 29—157.4 X |
| 1,709,865 | 4/1929 | Muffly | 113—118 |
| 2,554,185 | 5/1951 | Giegerich | 29—157.3 X |
| 3,266,128 | 8/1966 | Jacobs | 113—118 X |
| 1,831,533 | 11/1931 | Hubbard | 165—166 |
| 2,617,634 | 11/1952 | Jendrassik | 165—167 X |
| 3,240,268 | 3/1966 | Armes | 165—167 |

JOHN F. CAMPBELL, Primary Examiner

D. C. REILEY, Assistant Examiner

U.S. Cl. X.R.

29—469; 113—118; 165—166